Feb. 9, 1937.  H. A. HADLEY ET AL  2,070,011
RECORDING SCALE
Filed July 20, 1934  6 Sheets-Sheet 1
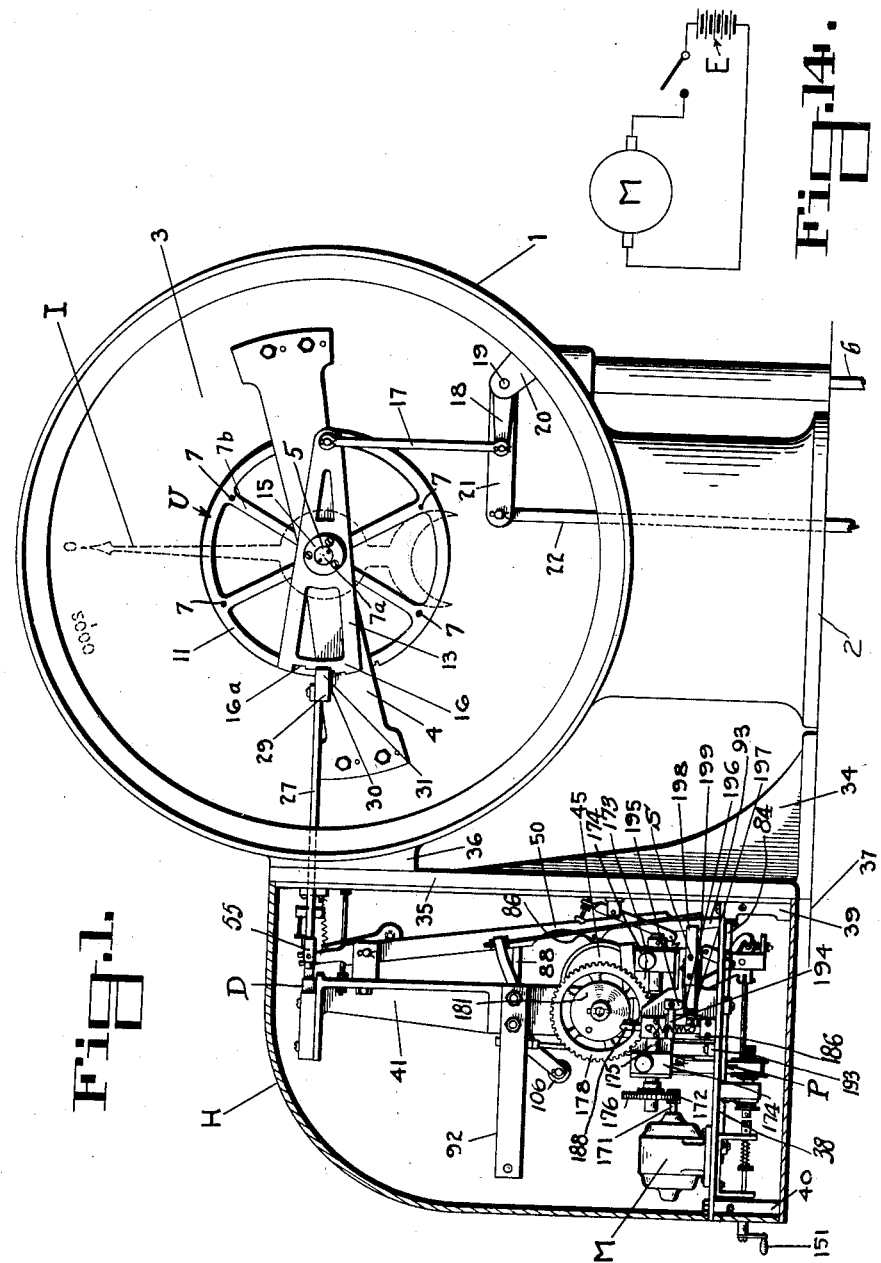
HARLAN A. HADLEY
GULDBRAND GULDBRANDSEN
INVENTORS
BY
*Franklin S. Brisbee*
ATTORNEY

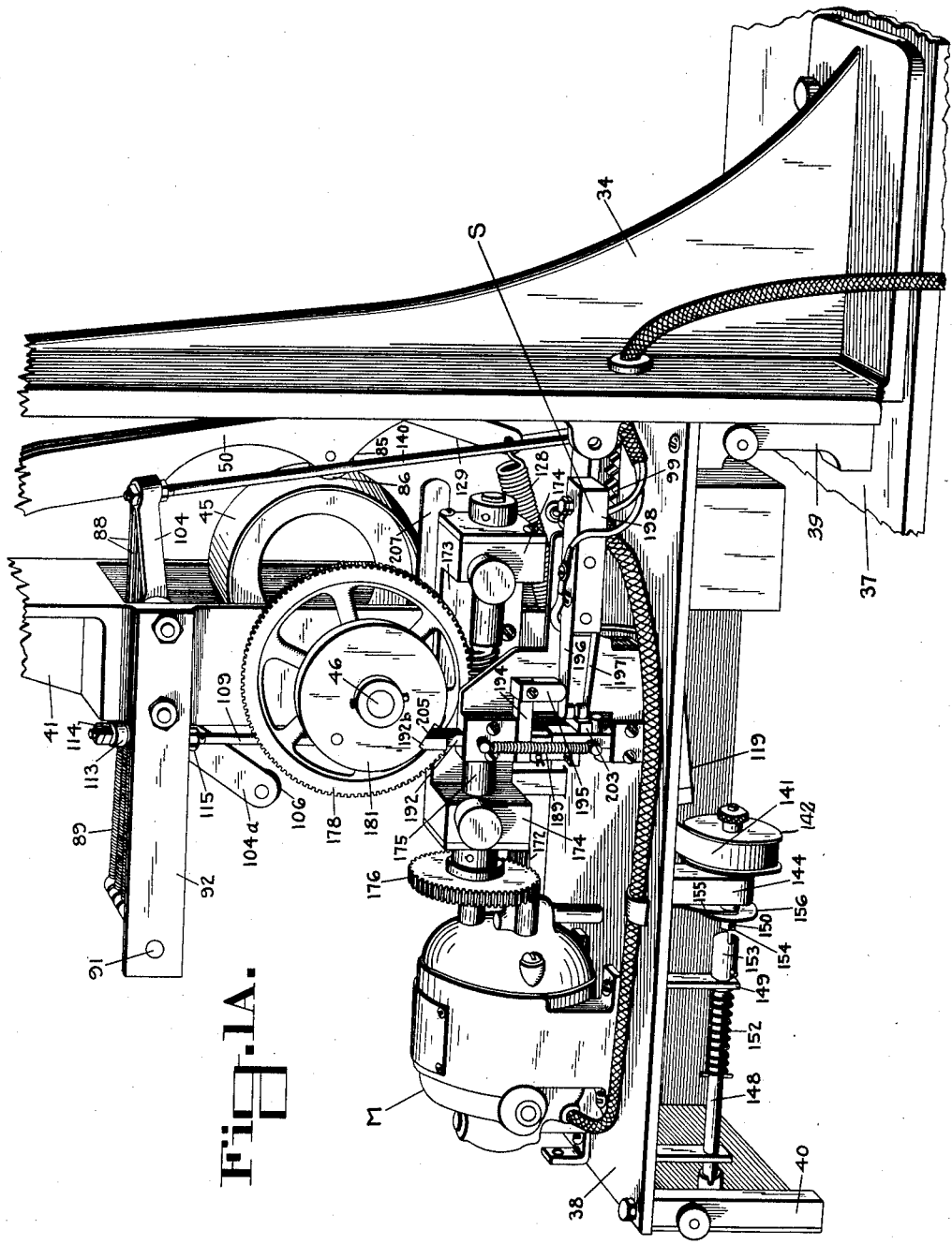

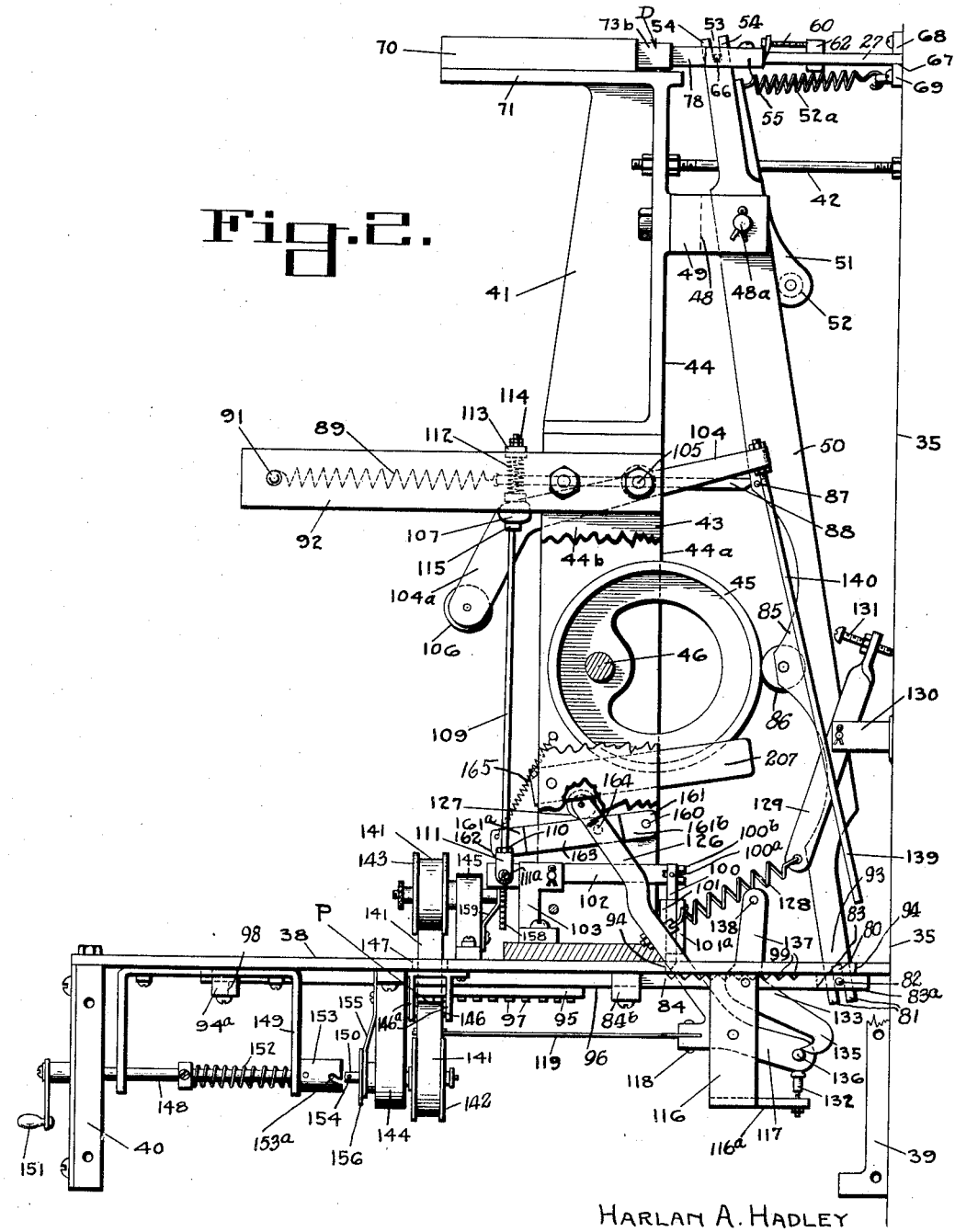

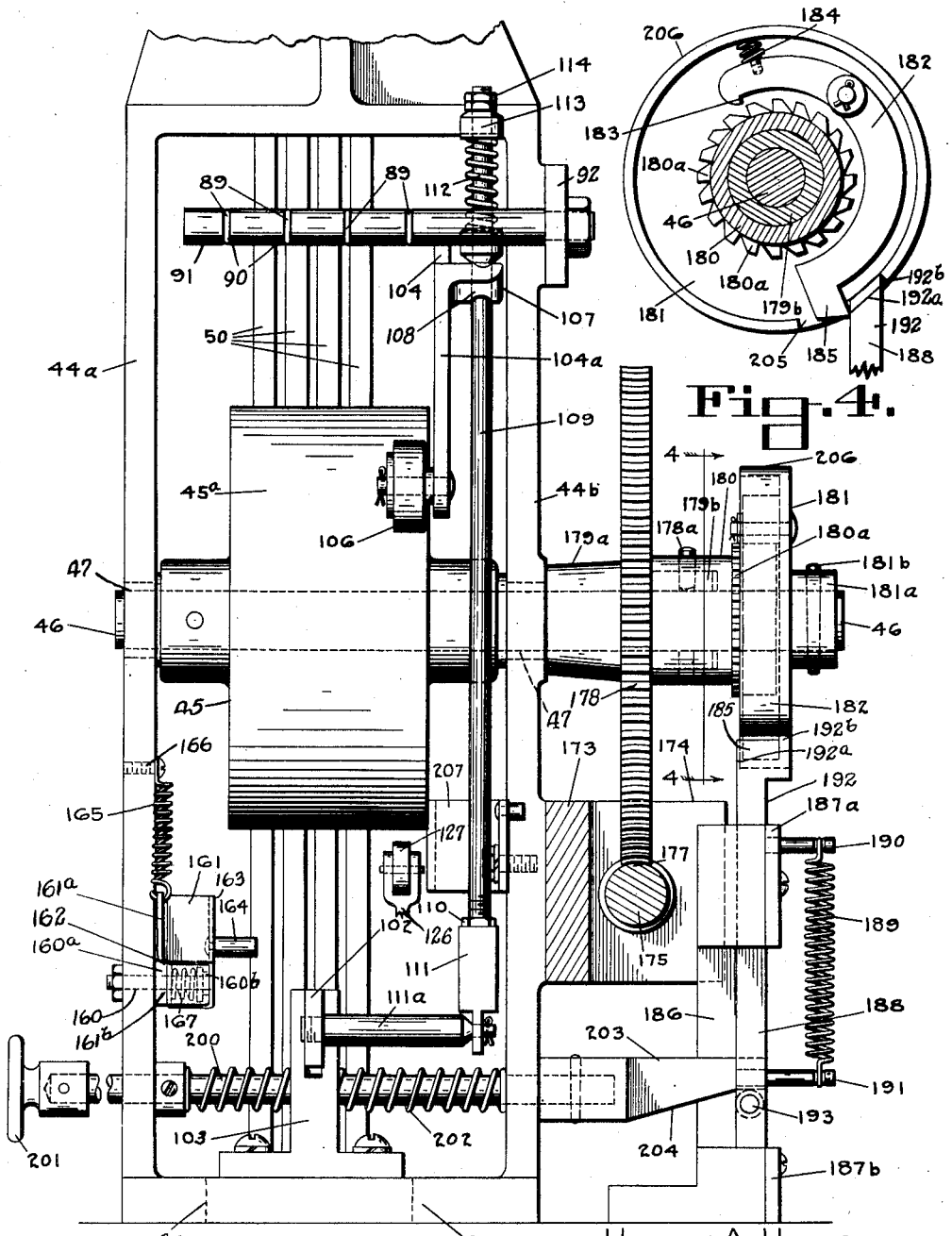

Feb. 9, 1937. H. A. HADLEY ET AL 2,070,011
RECORDING SCALE
Filed July 20, 1934 6 Sheets-Sheet 5
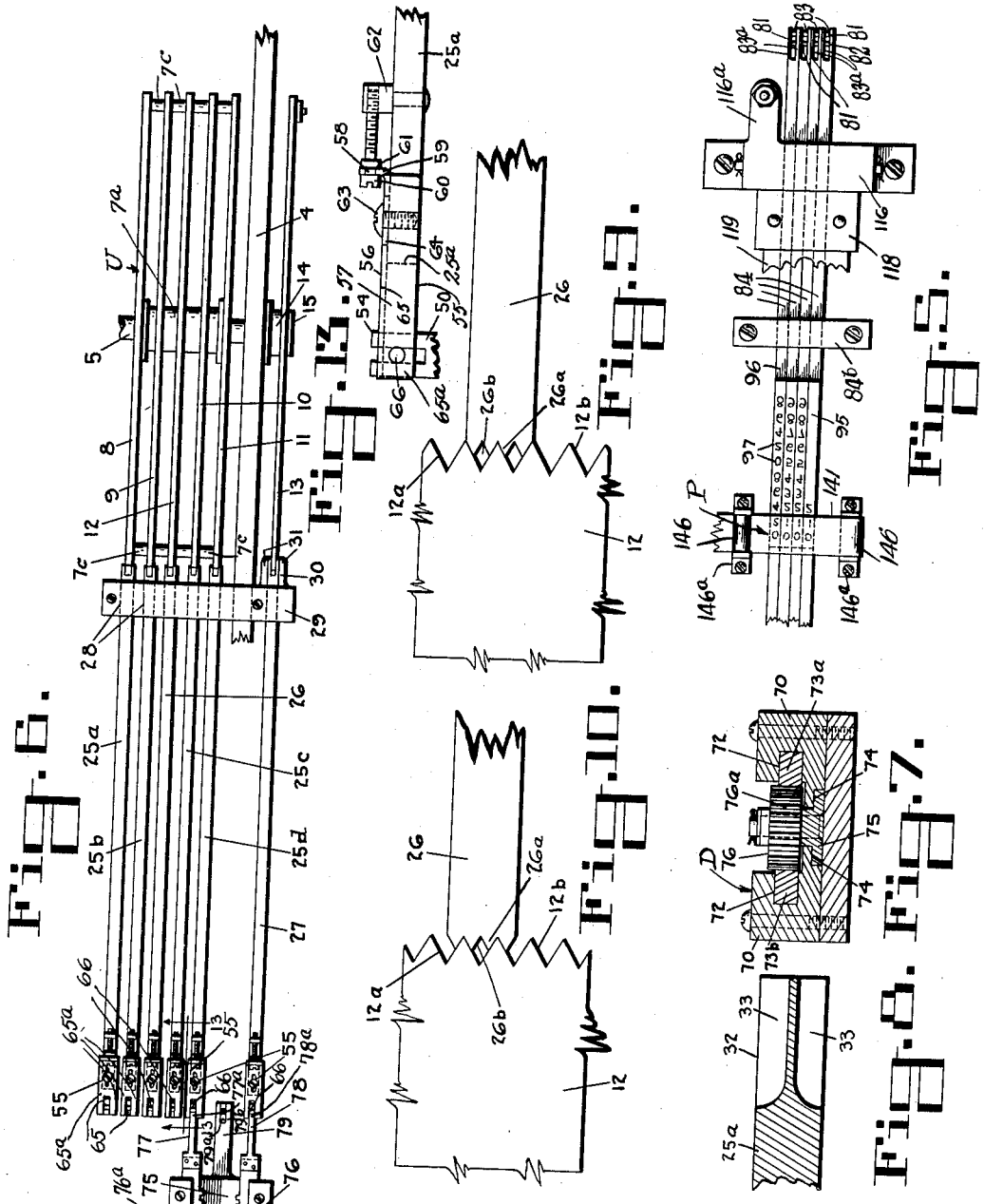
HARLAN A. HADLEY
GULDBRAND GULDBRANDSEN
INVENTORS
BY
ATTORNEY

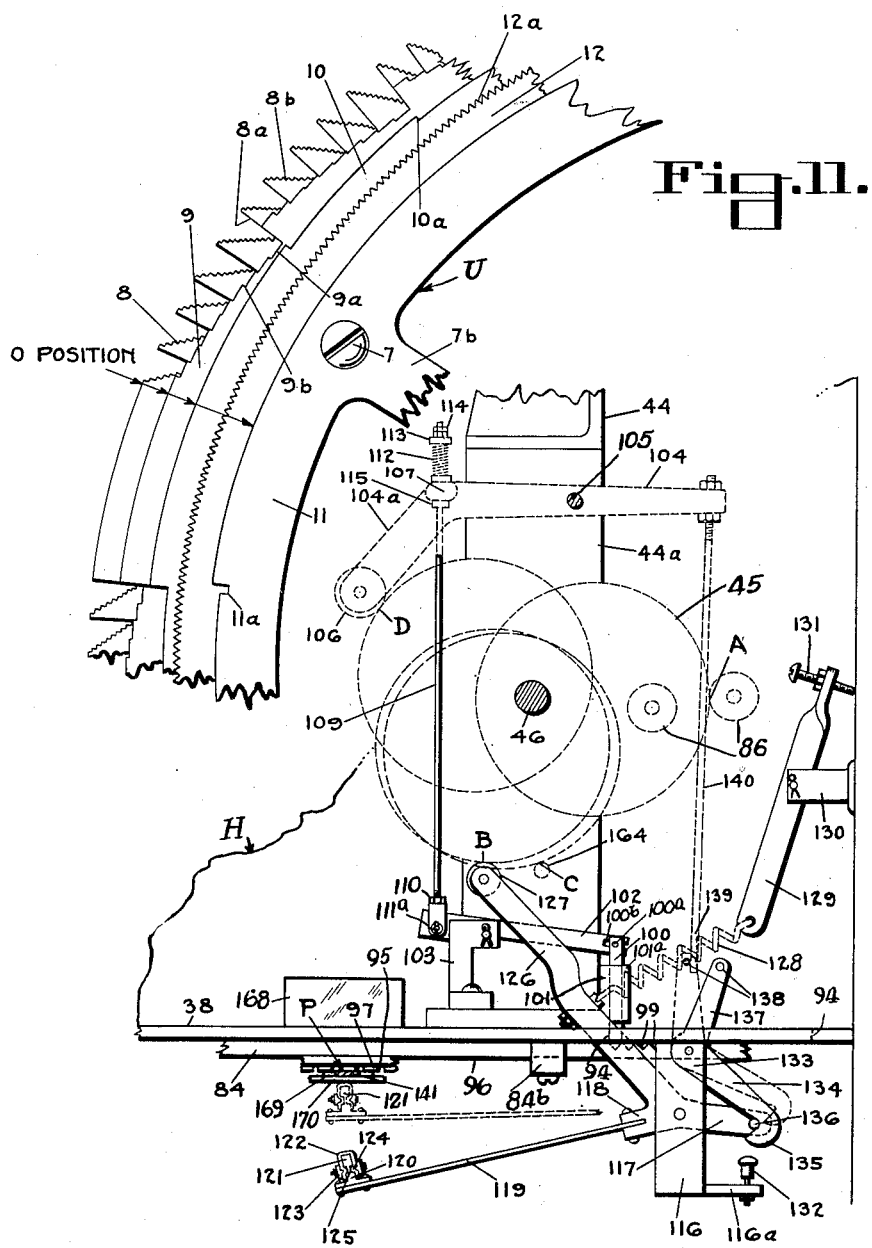

Patented Feb. 9, 1937

2,070,011

UNITED STATES PATENT OFFICE 2,070,011

RECORDING SCALE

Harlan A. Hadley and Guldbrand Guldbrandsen, St. Johnsbury, Vt., assignors to E. and T. Fairbanks and Company, St. Johnsbury, Vt., a corporation of Vermont Application July 20, 1934, Serial No. 736,158

27 Claims. (Cl. 265—5)

This invention relates to recording scales and more particularly to recording apparatus adapted for use with automatic dial scales.

An important object of the invention is to provide a compact and efficient mechanism adapted to select and transmit the weight of an article being weighed without imposing any drag on or interference with the weighing and indicator mechanism of the scale.

Another important object is to provide rotatable eccentric means for controlling the operation successively of various mechanisms including weight selector bars for engaging notched weight registering discs, mechanism for aligning and holding the type bars at the printing position, and printing mechanism for recording the registered weight.

Another object is to provide weight registering discs, each disc denoting a particular weight value, together with means for locating the weight registering discs with relation to the indicated weight graduation on the dial, which discs are all mounted on the indicator shaft and rotate therewith.

Another object is to provide means for registering increased capacities, added to the capacity of the dial by employing unit weights, to be transmitted to the registering mechanism whereby the total weight registered will be recorded.

Another object is to provide pivotally mounted type bar levers operatively connecting the selector bars with the type bars, the type bar levers being actuated by the rotatable eccentric means.

Another object is to provide means for normally holding the type bars beyond their printing position and the selector bars away from the weight registering discs in order to permit the discs to freely rotate with the dial indicator during the weighing operation.

Still another object is to provide a differential mechanism operatively connecting the thousands disc and the drop weight segment, whereby their combined weight values may be transmitted to the printing mechanism.

In order that the nature of our invention may be fully understood, we have illustrated certain embodiments of the invention in the accompanying drawings, in which,—

Figure 1 is a vertical side elevation, showing a preferred form of the recording mechanism applied to the indicator mechanism of a scale.

Figure 1A is an enlarged view in perspective of the recording mechanism and associated parts.

Figure 2 is a enlarged vertical side elevation, partly in section, of the recorder, showing the position of the co-operating parts and the printing hammer in its operative position at the moment of recording.

Figure 3 is an end view of the recording mechanism shown in Fig. 2, partly in section.

Figure 4 is a plan, partly in section, of the interior of the clutch housing.

Figure 5 is a plan of a portion of the underside of the base plate of the recorder showing the type bars and numerals.

Figure 6 is a top plan of the differential mechanism, showing the selector fingers in engagement with the notches of the weight selector discs in transmitting the weight values set up by the discs and the connection between the thousands disc and the segment with the differential.

Figure 7 is a cross-section of the differential mechanism, on the line 7—7 of Fig. 6.

Figure 8 is a longitudinal section, showing the contact tip end of the weight selector fingers.

Figure 9 is an enlarged fragmentary view showing the notched tip end of the special selector finger for the locating disc, showing the teeth in engagement with the notches of the disc.

Figure 10 is likewise an enlarged fragmentary view of the tip end of the secial selector finger for the locating disc, showing the notches in engagement with the teeth of the disc.

Figure 11 is an enlarged fragmentary, isometric view of the peripheries of the weight selector discs and locating disc, showing the notches in each weight selector disc for registering the particular weight value set up by each disc.

Figure 12 is a fragmentary view in vertical elevation of Fig. 2, partly diagrammatic, showing the cycle of rotation of the cam in successively actuating the different mechanisms of the recorder in recording the weight set up by the weight selector mechanism.

Figure 13 is a longitudinal section on the line 13—13 of Fig. 6, showing one of the selector finger, adjustable attaching members.

Figure 14 is a wiring diagram of the electrical circuit.

In the drawings 1 designates the dial head housing of an automatic dial scale surmounting the scale housing 2 and enclosing the dial 3 and indicator mechanism, essential parts of which only are shown in Fig. 1, including the supporting bracket 4 for the indicator shaft 5, the draft rod 6, and the weight selecting and recorder operating mechanisms, the recorder being enclosed by a housing H. For the purpose of clearly and fully disclosing our invention the scale illustrated in the drawings and described herein has been selected, having a dial capacity of 2000 pounds with graduations denoting 2 pounds each. The weight value selecting mechanism comprises a series of spaced, notched skeleton weight selector and locating discs joined together in an integral assembly unit U (Figs. 6 and 11) by spaced pins 7 and fixedly mounted by a hub 7a on the indicator shaft 5 and revolving therewith. The weight selector discs comprise a unit disc 8 provided on its periphery with 100 notches 8a (Fig. 11), each notch having ten steps 8b, providing thereby for a capacity of 1000 units of a weight value of 2 pounds each, a tens disc 9 having 20 notches 9a with 10 steps 9b each, providing for a capacity of 200 tens, a hundreds disc 10 having 19 notches 10a, of a unit value of 100 each, thus giving a capacity of 19 hundreds, while a thousands disc 11 has two notches 11a and 11b of a value of 1000 and 2000 units respectively. It is to be noted that the total capacity of the hundreds disc 10 is 1900 units, for the reason that on reaching its maximum point the second notch on the thousands disc 11 comes into position to register 2000 units. In their inoperative positions, as indicated in Fig. 11, the zero points comprise plain portions on the peripheries of the various discs and align with the zero graduation of the dial 3.

In the above example the unit values as noted are two pounds each, but the unit value may be varied in accordance with the weight value of the dial graduations, for example one pound, or as in a dial having 10,000 pounds capacity, each graduation or unit on the dial may have a weight value of 10 pounds. Moreover, it is to be noted that there is a weight selector disc for each digit in the total capacity of the dial.

The outer discs in the assembly unit U are provided with spokes 7b attached to the hub 7a, while the inner discs are formed into flat annular rings without spokes and are mounted on the pins 7, which construction permits all the discs to be assembled in one compact unit and to provide a relatively light assembly to be carried by the indicator shaft 5 without imposing any drag thereon. Spacers 7c mounted on the pins 7 hold the discs in proper spaced relation and operative position.

In conjunction with the weight selector discs there is employed a star wheel or locating disc 12 (Figs. 6 and 11) mounted on the indicator shaft 5 with the weight selector discs 8, 9, 10 and 11 and provided on its periphery with a series of V-shaped teeth 12a, and notches 12b having one notch for each weight graduation on the dial and co-inciding operatively therewith. The locating disc 12 is adapted to serve, as will be hereinafter described as means for locating each of the weight selector discs at the nearest point where the indicator I comes to rest, in order to register the proper weight indication of the load for the particular weight selector disc.

The locating disc 12 may be provided on its periphery with one tooth for each graduation of the dial, as for example, 2000 teeth for the dial shown, having 2000 pounds capacity, and dials of higher capacity accordingly. However, it is preferred to provide a locating disc for a dial of 2000 pounds capacity, as shown, with 500 teeth (Fig. 11) well spaced apart and co-operating with a special selector finger, as hereinafter described and shown in Figs. 9 and 10, whereby the same result is accomplished as by employing 2000 teeth and with greater accuracy.

Increased capacity mechanism

When the dial capacity is increased by employing drop weights, as in the present scale, (Fig. 1) and fully shown and described in Patent No. 2,014,275, Means for increasing the capacity of scales, Alfred Bousfield, September 10, 1935, a segment 13 is pivotally mounted on an annular boss 14 carried by the bracket 4 and retained in position by a spacer cap 15, the longitudinal axis of which boss is in alignment with the longitudinal axis of the indicator shaft 5 extending therethrough. However, when the scale has a larger capacity other segments may be added to take care of the increased capacity. The segment 13 is provided on its arcuate portion 16 with as many notches 16a as there are drop weights employed, four in the scale shown, each notch registering a capacity of 2000 pounds, which is the capacity of each drop weight and equivalent to the capacity of the dial, thereby making the total capacity of the scale 10,000 pounds, including the combined capacity of the drop weights and the dial. The operation of the segment 13 is effected through its connection with the drop weight operating mechanism, as fully shown in the aforementioned patent, by employing a depending rod 17 (Fig. 1), having its upper end pivotally mounted on the opposite end of the segment and its lower end pivotally connected to an arm 18 in turn fixedly attached to a shaft 19 mounted in spaced bosses 20 extending from the dial housing 1. The shaft 19 likewise has fixedly mounted thereon an elongated arm 21, disposed in longitudinal alignment with the arm 18 and movable therewith under uniform control of the shaft 19. The free end of the elongated arm 21 is pivotally connected to the upper end of a vertical rack rod 22, operatively connected to the drop weight mechanism, and upon the upward movement of the rack rod 22 and the arm 21, when a drop weight is added, the segment 13 is moved accordingly so as to bring the proper notch 16a into its registering position, thereby adding the 2000 pounds capacity of the particular drop weight to the weight indicated on the dial.

Transmission of weight value to the recorder

In order to transmit the total weight values set up by the weight selector discs 8, 9, 10 and 11 and segment 13, to the recording mechanism spaced weight selector fingers 25a, 25b, 25c, and 25d, (Fig. 6) preferably rectangular in section, one for each weight selector disc 8, 9, 10 and 11 respectively, a special finger 26 for the locating disc 12, and a segment finger 27 for the segment 13, are slidably mounted in spaced slots 28 in a guide block 29 attached to the bracket 4 and adjacent to the weight selector discs. Each selector finger is provided at its inner end with a contact tip 32, (Fig. 8) formed between opposed grooves 33 and adapted to engage the notches in the weight selector discs. The special selector finger 26 for the locating disc 12, having 500 teeth 12a which operates in advance of the disc fingers 25a, 25b, 25c, 25d, and segment finger 27, is provided with a tip having four fixed, non-resilient teeth 26a and three intervening notches 26b (Figs. 9 and 10), which teeth are longitudinally disposed in the same plane with each other and co-operate with both the teeth 12a of the locating disc 12 and the relatively wide and deep intervening notches 12b, thereby doubling the tooth capacity of the locating disc 12. When using a locating disc with 1000 notches 12b the locating finger 26 engages the notches 12b only in locating the proper position of the locating disc 12. Thus the selector fingers are adapted to co-operate with the weight selector discs and segment in selecting and transmitting the weight values set up thereby. The guide block 29 has an extension 30, in which the segment selector finger 27 slides, and is provided with spaced arms 31, which are adapted to serve as guides for the segment 13 and retain it in position.

*Recording mechanism*

The weight recording mechanism is mounted on a bracket 34 (Fig. 1) secured by its upright attaching plate 35 to a rectangular boss 36 at one side of the dial head housing 1 and having its base bolted to the top plate 37 of the scale housing 2. Extending laterally from the bracket 34 is a base plate 38 (Figs. 2 and 3) mounted on spaced supports 39 and 40, upon which are mounted a base plate, side plates, and an end plate (not shown) forming an enclosure for the printing mechanism (Fig. 2), the inner supports 39 being integral with the attaching plate 35. Located approximately midway of the base plate 38 is an upright standard 41, substantially coextensive with the upright attaching plate 35, connected thereto near its upper end by a tie rod 42, and provided with a lower supporting section 43 having spaced supports 44a and 44b. An important feature of the invention is a rotatable circular cam 45 having a wide face 45a (Figs. 2, 3 and 12), which constitutes a universal control for the operation in sequence of the various actuating mechanisms of the recording unit, as will be hereinafter fully described, and is fixedly mounted on a shaft 46 with its axis off center the shaft being pivoted in spaced openings 47 in the supports 44a and 44b of the upright standard 41. Pivotally mounted in elongated slots 48 on a shaft 48a (Fig. 2) disposed in a laterally extending assembly block 49, which is attached to the standard 41, are depending type bar operating levers 50, one for each disc selector finger 25a, 25b, 25c, and 25d, and segment finger 27, and disposed below and in vertical relation to its respective co-operating selector finger 25a, 25b, 25c, and 25d or 27. A special short lever 51 (Fig. 2) not used for recording is pivoted on the shaft 48a and is adapted to advance and retract the locating disc finger 26 under control of an adjoining weight selector finger with which it is operatively held in engagement by a laterally mounted roller 52, under tension of a coiled spring 52a attached to the upper end of the lever 51 and the attaching plate 35. Each type bar lever 50 is provided with a transverse slot 53 forming spaced arms 54 at its upper end.

Adjustable means is provided for operatively connecting the selector fingers to the type bar operating levers 50 (Figs. 6 and 13), as well as adjusting the finger tips in relation to their engagement with the co-operating discs. The adjustable means comprises an adjustment tip 55 slidably mounted on the inner end of each selector finger 25a, 25b, 25c, and 25d, 26 and 27 and formed with a top plate 56 and depending sides 57 engaging the top and sides of the selector fingers. Mounted between spaced arms 58 of an upright lug 59 at the inner end of the top plate 56 is an adjusting screw 60 having in its head an annular groove 61, in which the spaced arms 58 fit and the adjusting screw turns in effecting adjustment of the adjustment tip 55, while its threaded end engages a threaded stud 62 secured to the selector finger, by which means the selector finger may be readily and accurately adjusted to the desired position without any special fitting of the parts. A threaded locking screw 63 inserted in the co-operating end of the selector finger and extending through an elongated slot 64 in the top plate 56 of the adjustment tip 55 serves to lock the adjustment tip in its adjusted position. In order to form suitable connecting means between the adjustment tips 55 and the type bar operating levers 50 (Fig. 13) there is provided in the outer end of the top plate of each adjustment tip 55 an elongated slot 65, forming spaced arms 65a in which is transversely mounted a fixed pin 66, which is freely engaged between the spaced arms 54 of its co-operating type bar operating lever 50 without any binding or jamming of the parts and serves thereby as a pivot pin for the spaced arms 54. In locating the selector fingers 25a, 25b, 25c, 25d, 26 and 27 in position to engage the selector discs and segment 13 they are adapted to extend and slide through a rectangular opening 67 (Fig. 2) in the upper end of the upright plate 35, the upper and lower edges of the opening having spaced guide plates 68 and 69 secured thereto, the selector fingers sliding freely on the lower plate 69 in their operative movement to and from the selector discs.

*Differential mechanism*

In order to permit the weight value set up by the segment 13 by the drop weights, to be combined with and added to the weight value set up by the thousands disc 11 a differential mechanism D (Figs. 1, 2, 6 and 7) is employed, which is mounted in spaced guide blocks 70 secured to a platform 71 extending outwardly from the top end of the standard 41. The guide blocks 70 are provided with opposed upper longitudinal channels 72 (Fig. 7) in which are slidably mounted toothed rack bars 73a and 73b having their teeth facing inwardly, while in lower opposed longitudinal channels 74 is slidably mounted a plate 75 provided on its upper side with a centrally disposed rotatable gear wheel 76 having its teeth 76a freely meshing with the teeth of the opposed rack bars 73a and 73b. The rack bar 73a (Fig. 6) is provided with a connecting arm 77 having a transversely slotted end 77a engaging the transverse pin 66 in the adjustment tip 55 of the thousands selector finger 25d, while the rack bar 73b is likewise provided with a connecting arm 78 having its forked end 78a in engagement with the transverse pin 66 in the adjustment tip 55 of the segment finger 27. Extending inwardly from the plate 75 is a connecting arm 79 provided with a transversely slotted end 79a, engaging a transverse pin 66 which is carried by the adjustment tip 55 mounted on the selector finger 27.

Thus, when the rack bar 73a is moved inwardly by the thousands selector finger 25d as it engages the notch 11a of the thousands disc 11 in registering the full capacity of the dial, the rack bar 73a is thereby moved inwardly. This movement of the rack bar 73a causes the slidable plate 75 and the rack bar 73b to slide inwardly, thus carrying forward the connecting arm 79 and the segment finger 27 to engage the particular relatively deep notch 16a set up by one or more drop weights employed, so as to move through the movement of the connecting arm 79 the co-operating type bar 50 sufficiently to set up in the printing mechanism the combined weight values established by the thousands disc 11 and the segment 13. This differential mechanism functions in a manner similar to a floating even balance lever in permitting the co-operative movement of the thousands selector finger 25d and the segment finger 27 to position the connecting arm 79 so as to magnify the movement of the co-operating type bar 50 accordingly in order to set up the proper type numerals in the printing mechanism. The rack bars 73a and 73b are moved during each weighing operation in accordance with the position of the tip of the selector finger 25d in the notches in the thousands disc 11, and the position of the tip of the selector finger 27 in the notches in the segment 13. However, the differential mechanism permits either rack bar 73a or 73b to be moved independently of the other, when a recording is made of a weight value set up by the thousands disc 11 or the segment 13 alone.

It is to be noted that when the dial chart capacity is in even digits, as 10's, 100's and 1000, a differential would not be required, but when uneven digits are used for the dial chart capacity such as 2000, 3000 and 5000, for example, a differential would be required. Further, in the latter case using a differential, when the drop weight is applied and the next chart capacity added to that of the drop weight the fourth or thousand digit will be changed two, three or five times accordingly.

*Control of operation of selector fingers and type bars*

By employing the connecting means described above, the type bar operating levers in operation are swung on the pivot pins 66 in accordance with the longitudinal movement of their co-operating selector fingers. Moreover, the lower end of each type bar operating lever 50 (Fig. 2) is likewise provided with a transverse slot 80 and spaced arms 81, which are adapted to engage a fixed pin 82 mounted in the spaced arms 83a formed by an elongated slot 83 in the inner end of each one of a group of type bars 84 slidably mounted in spaced guideways 84a and 84b secured to the under side of the base plate 38 (Fig. 5). Thus motion initiated by the inward and outward movement of the selector fingers 25a, 25b, 25c, 25d and 27 is readily transmitted to the type bar operating levers 50 and hence to the type bars 84. Each of the type bar operating levers 50 is provided with a slotted extended portion 85 on the inner side facing the rotatable cam 45 and has a freely rotatable roller 86 mounted therein adapted to be engaged by the rotatable cam 45 previous to and after its rotation. Pivotally mounted above each roller 86 in a slot 87 is a longitudinal bar 88 having a retractile coiled spring 89 attached to its outer end which controls the inward movement of the type bar operating levers 50 and the various selector fingers and the type bars 84, operatively connected thereto, to their operative positions (Fig. 12), while the outer end of the spring is secured in an annular groove 90 in a transversely disposed rod 91 mounted in an arm 92 attached to the support 44b of the standard 41. By this resilient means each roller 86 is held in engagement with the rotatable cam 45, both while stationary and while the operating levers 50, under control of the rotatable control cam 45, are being retracted with their co-operating elector fingers 25a, 25b, 25c, 25d, and 27 in order to free them from engagement with the discs and segment 13 and return them to their inoperative positions, when the recording mechanism has completed its operation. It is evident, therefore, that the weight of the load as set up by the discs 8, 9, 10, and 11 is readily and efficiently transmitted by the selector fingers 25a, 25b, 25c, 25d, and 27 and the operating levers 50 to the type bars 84 for recording thereby.

*Printing mechanism*

The printing mechanism includes the series of type bars 84 (Figs. 2, 3, 5 and 12), one for each weight selector disc 8, 9, 10 and 11 and segment 13, which are mounted longitudinally on the under side of the base plate 38 and slide freely in the spaced guide blocks 84a and 84b, the lower ends 93 of the type bar operating levers 50 with their spaced arms 81 extending through an elongated opening 94 in the base plate 38 and engaging therebetween the transverse pivot pin 82 disposed in the slot 83 in the end of each type bar, the spaced arms 81 of the operating levers 50 being adapted to move freely in the base plate opening 94 in advancing and retracting the type bars 84 during the printing operation. Each type bar 84 is provided with a type plate 95 fixed on the lower side 96 and carrying a series of type numerals 97 from 0 to 9, the outer ends of the type plates 95 extending into a clearance and stop opening 98 in the guide block 84a (Fig. 2). In operation the type numerals 97 are moved by the levers 50 to the printing station P in accordance with the weight values set up by the weight selector discs and segment as previously described.

In order to accurately align the co-operating type numerals at the printing station P the upper side of each type bar 84 is provided near its inner end with a series of V-shaped aligning notches 99, one for each numeral, 0 to 9 inclusive, with which notches a vertically disposed aligning dog 100 (Figs. 2 and 12) provided with an elongated V-shaped lower end, is adapted to be moved downwardly into engagement with the particular notches 99 set up and thus align and lock the type bars 84 and selected numerals at the printing station previous to recording. The aligning dog 100, shown in its raised or inoperative position in Fig. 2, is slidably mounted in a grooved guide block 101 and held in position by a retaining plate 101a attached to the guide block. The aligning dog is located at the outer end of the opening 94 in the base plate 38 and is pivotally connected to a lever 102, which is likewise pivotally mounted in a bracket 103 spaced from the bracket 101 and in alignment therewith. An operating control lever 104 (Figs. 2 and 3) for the aligning and locking dog 100 and other printing mechanism, is pivotally mounted on a pin 105 extending laterally from the inner wall of the inner standard support 44b and is provided with a downwardly and angularly disposed outer end 104a carrying a roller 106 which is adapted to be engaged by the rotatable cam 45 when in operation. Extending laterally from the operating lever 104 is a lug 107 (Figs. 2 and 3) having a vertical opening 108, in which is inserted a depending rod 109 having its threaded lower end adjustably mounted and secured by a lock nut 110 in a connecting member 111, which is pivotally connected to the aligning dog lever 102 by a laterally extending pin 111a attached thereto. An expanded coiled spring 112, is mounted on the upper end of the depending rod 109 between the lug 107 and an adjusting nut 113 secured by a lock nut 114 at the tip end of the rod 109, upon which a collar 115 is secured below the lug 107, which is adapted to limit the upward movement of the rod 109. Thus the expanded coiled spring 112 with its tension properly adjusted by the position of the adjusting nut 113 in relation thereto serves to act as a relieving means to permit the aligning dog 100 to resiliently engage the aligning notches 99 and prevent any jamming of the parts or injury thereto during operation.

Pivotally mounted in a U-shaped bracket 116 secured to the under side of the base plate 38 adjacent to its inner end, is a printing hammer 117 (Figs. 2 and 12) having a slotted lug 118 extending therefrom, in which is secured an elongated printing hammer arm 119 having fixed on its free end a transversely disposed printing platen 120, T-shaped in section. The center plate 121 of the platen is faced with a leather bumper 122, which is held in place by opposed clamping plates 123 having longitudinal ribs 124 pressing the leather into cooperating slots 125 in the center plate 121 and the plates are attached thereto by spaced screws. Extending upwardly and angularly from the printing hammer 117 is a printing hammer control arm 126 provided at its upper end with a roller 127, which is engaged by the rotatable cam 45 at the proper point in its operation. A coiled tension spring 128 is mounted by one end midway of the control arm 126 and has its other end freely mounted in an opening in the lower end of a tension lever 129, which is pivotally mounted in a bracket 130 attached to the attaching plate 35 and provided at its upper end with an adjusting screw 131 engaging the attaching plate 35. Located below the printing hammer 117 on a lug 116a extending laterally from the base plate of the bracket 116 is an adjusting screw 132 adapted to engage the lower end of the printing hammer 117 in adjusting it and the platen 120 to their proper positions in relation to the type plate 95 at the moment of printing (Fig. 3). An L-shaped cocking and releasing lever 133 for the printing hammer 117 (Figs. 2 and 12) is pivotally mounted on the inner arm of the bracket 116 and has formed at the end of its lower arm 134 a hook 135 adapted, in cocking the printing hammer 117, to engage a laterally extending pin 136 carried by the lower end of the printing hammer 117. The upper arm 137 is provided at its upper end with a laterally extending pin 138, which in releasing the printing hammer 117 for firing is engaged by the lower end 139 of a depending printing actuating control rod 140 attached to the inner end of the operating control lever 104, when the rotatable cam 45 engages the roller 106 during its rotation, as shown in dotted outline in Fig. 12. The inking mechanism (Fig. 2) comprises an inked ribbon 141, which is transversely disposed below the printing station P under the base plate 38 and is carried by spaced rotatable spools 142 and 143, located below and above the base plate 38 in brackets 144 and 145 respectively and traveling from the lower spool 142 over spaced guide rollers 146 (Fig. 5), mounted in spaced brackets 146a secured to the base plate 38, and passing through a rectangular opening 147 to the upper spool 143. In order to rewind the ribbon 141 from one spool to the other when unwound as used, a plunger rod 148 is employed, which is slidably mounted in the spaced arms of a bracket 149 in longitudinal alignment with the spindle 150 of the lower ribbon spool 142. The plunger rod 148 is provided at its outer end with an operating crank 151, a retractile coiled spring 152 and clutch head 153 having a transverse slot 153a in the end, which is adapted to engage a transverse pin 154, carried by the outer end of the ribbon spool spindle 150, in rewinding the ribbon 141. An angularly disposed drag arm 155 frictionally engaging a disc 156 secured to the spindle 150, serves to permit the ribbon to gradually unwind. The spindle 157 of the upper ribbon spool 143 carries on its outer end a toothed wheel 158, which is likewise engaged by a similar drag arm 159 adapted to co-operate with the drag arm 155 of the lower spool 142 in holding the ribbon taut. Pivotally mounted in a plane above the ribbon spool wheel 158 on the inner side of the standard support 44a on a stud 160 mounted thereon is a ribbon actuating member or pawl 161 (Figs. 2 and 3) having at its outer end 161a a beveled edge 162 adapted to engage the teeth of the ribbon spool wheel 158 in turning the upper ribbon spool 143 and drawing the ribbon 141 along from the lower spool 142. The actuating pawl 161 is formed from a single strip of metal having end portions 161a and 161b and a middle outwardly raised portion 163 carrying a laterally extending operating pin 164 adapted to be engaged by the cam 45 in its cycle (Fig. 12) and to press the beveled edge 162 of the actuating pawl 161 into engagement with the teeth of the ribbon spool wheel 158 and thus actuate the upper ribbon spool 143 and ribbon 141. A retractile coiled spring 165 attached to the outer end 161a of the actuating pawl 161 and a screw 166 inserted in the standard support 44a serves to retract the bar when the operating pin 164 is freed from engagement with the cam 45. The inner end 161b of the actuating pawl 161 engages an expanded coiled spring 167, which is mounted on the stud 160 between the inner end 161b of the actuating pawl 161 resting against a spacer 160a and the head 160b of the stud 160, which gives resiliency to the actuating pawl 161 and allows ample lateral play thereto in engaging and pushing along the teeth of the ribbon spool wheel 158. A window 168 is located in the housing H in line with the upper ribbon spool 143, which permits the operator to observe when the ribbon needs rewinding. A ticket guide slot 169 is provided in a guide plate 170 secured to the housing H and disposed below the window 168, which is aligned with the type numerals at the printing station P and adapted to guide a ticket 170 (Fig. 12) between the ribbon 141 and platen 121 of the printing hammer 118 in printing the registered weight value of the load on the ticket. It is obvious that a roll of paper tape or paper sheets may be readily substituted for tickets by lengthening the ticket slot to accommodate the paper sheets, for example.

*Electric motor driving and clutch control mechanisms*

The rotatable cam 45 is operated by an electric motor M (Fig. 1) mounted on the base plate 38 adjacent to the standard 41, which is connected to an electric energizing source E, and carries on the inner end of its shaft 171 a metal gear 172. Disposed in a plane slightly above the motor shaft 171 (Fig. 1) and parallel thereto is a bracket 173, (Figs. 1 and 3) secured to the arm 44b of the standard 41 and provided with spaced arms 174 carrying ball bearing units, in which there is mounted a shaft 175 provided at its outer end with a gear 176, preferably a fibre gear, which meshes with the motor shaft gear 172 and is of greater diameter. Midway of the bracket shaft is cut a worm 177, which meshes with a relatively large spur gear wheel 178 having its hub 179a and 179b extending on each side and rotatively mounted on the cam shaft 46. By this means the worm 177 is adapted to transmit motion initiated by the electric motor M to the spur gear wheel 178 and thus rotate the cam 45 as hereinafter described. The outwardly extending hub portion 179b of the spur gear wheel 178 is fixedly mounted by a pin 178a in the hub 180 of the ratchet wheel 180a of the clutch mechanism (Fig. 4), which wheel extends into an open circular clutch housing 181 having its hub 181a pinned to the cam shaft 46 by a pin 181b. Pivotally mounted in the clutch housing is a pawl 182 provided at its upper end with a depending tooth 183 adapted under the tension of an expanded coiled spring 184 to engage the ratchet wheel 180a during the rotation of the cam 45 and having at the lower end a depending finger 185. Actuating control means (Fig. 3) is located below the housing and includes a bracket 186 having slidably mounted thereon in spaced guide blocks 187a and 187b, a vertical reciprocating plunger 188 provided with a retractile coiled spring 189 fixed to a pin 190 in the upper guide block 187a and a pin 191 in the plunger 188. The plunger 188 has its tip end 192 provided with an extended lower beveled portion 192a and an upwardly extending upper beveled portion 192b, the former being adapted normally to engage the depending finger 185 (Fig. 4) and hold the pawl 182 and the clutch mechanism in its locked position (Fig. 4), the cam 45 being then stationary and the plunger 188, carrying adjacent to its lower end an outwardly extending contact pin 193. Spaced above the pin 193 is an inwardly extending arm 194 (Fig. 1) having attached to its end a depending insulating finger 195 adapted in operation to engage the upper of two spaced contact strips 196 and 197 of the electric switch S attached to an insulating block 198, fixed to an arm 199 extending inwardly from the bracket 186 and in circuit with the motor M and the electrical source E. Disposed below the bracket 186 in aligned openings in the spaced standard arms 44a and 44b is an actuating plunger 200 (Fig. 3) having on its outer end a push button 201 and provided with a retractile coiled spring 202, while at the inner end is attached an operating member 203 having a beveled under edge 204, which is adapted in operation to engage the contact pin 193 of the plunger 188, which in its downward movement causes the finger 195 to press the upper contact strip 196 into engagement with the lower contact strip 197, thereby closing the circuit and energizing the motor M. At the same time the beveled plunger tip end 192a is drawn down out of engagement with the pawl finger 185 through an opening 205 in the rim 206 of the clutch housing 181, thereby freeing the pawl 182, while under the urge of the coiled spring 184 the tooth 183 is pressed into engagement with the ratchet wheel 180a, thereby operatively connecting the clutch housing 181 fixed to the shaft 46, with the spur gear wheel 178 and permitting it to turn with the rotating worm 177 and thus rotate the controlling cam 45 to successively operate the various auxiliary mechanisms of the recorder in its cycle. As the cam 45 revolves the upper beveled plunger tip end 192b is adapted to engage and follow the rim 206 of the clutch housing 181 during the entire rotation of the cam 45, and upon completing its cycle the plunger tip end 192a is pushed upwardly through the rim opening 205 by action of the coiled spring 189 into engagement with the pawl finger 185 as shown in Fig. 4, thereby rocking the pawl 182 and releasing the pawl tooth 183 from the ratchet wheel 180a and thus stopping the cam 45 and holding it in its position to begin another cycle (Fig. 2).

*Operation of the recorder*

Initially and previous to the operation of the recorder, the universal control cam 45 in its extended outer inoperative position (Figs. 1, 1A and 2) is adapted to hold back the type bar levers 50 so that the type bars 84 are all held beyond their zero position (Fig. 5), while the selector fingers 25a, b, c, d, 26 and 27 are all held away from their cooperating discs 8, 9, 10, 11 and 12, and the segment 13, in order that the discs may first be permitted to revolve freely with the indicator I as the weight value of the load is being set up on the discs. After the discs have set up the weight value the recorder is put in operation by the operator pushing the push button 201 of the switch S, which closes the contact strips 196 and 197 (Fig. 1), and energizes the motor M, releasing the clutch and the spur gear wheel 178 which revolves the cam 45. At this point the cam starting its cycle, as graphically illustrated in Fig. 12 and positioned at station A, gradually releases in its downward clockwise movement the type bar levers 50, as their rollers 86 follow the periphery of the cam, their tension springs 89 drawing forward the levers 50 and keeping them in contact wiith the cam until the cam gradually releases them and leaves them free to be moved by the tension springs 89 (Fig. 12). The forward movement of the levers 50 causes the selector fingers 26, 25a, b, c, d, and 27 carried thereby to move inwardly in the above sequence until they contact with the proper notches in the discs and segment, while the cam 45 engages in its initial travel by its inner edge an inclined drag arm 207 attached to the inner side of the support 44b (Fig 3), which slows up temporarily the movement of the cam 45 and the levers 50 and thereby permits the type bars 84 to be moved under control of the springs 89 gradually into their operative positions without any jar or jamming of the parts when the cam leaves the levers 50 free to move. Thus each type bar 84 is accurately moved so as to position its respective type numeral 97 set up thereby at the printing station P.

The cam 45 in its continued rotation next engages at station B the roller 127 on the printing hammer control arm 126, shown in Fig. 2 in its initial position, pressing down the control arm to the position indicated in full outline in Fig. 12 and causing thereby the hook 135 of the cocking dog 133 to engage the pin 136 carried by the arm of the printing hammer and thus cock the hammer.

Passing along in its travel the cam 45 engages at station C the pin 164 carried by the ribbon feed arm 161. Then the cam 45 swings upward to engage at station D the roller 106 of the operating control lever 104, which is pushed upward to the position shown in Fig. 12, which movement raises the depending rod 109 causing the aligning dog 100 to engage the proper notches 99 to align and hold the type bars 84 with the registered numerals at the printing station P.

The other depending printing actuating rod 140, carried on the opposite end of the operating control lever 104, then engages the pin 138 of the cocking dog pushing it forward, thereby disengaging the hook 135 from the pin 136 of the printing hammer 117, which is fired by the action of the coiled tension spring 128 and carries the platen 121 upward to the position shown in dotted outline in Fig. 12, to the printing station P and prints a record on a ticket 170 or sheet of paper of the weight value set up by the recording mechanism. Thus the rotative cycle of the control cam 45 is completed and it is brought back with the type bar operating levers 50 and type bars 84 to their inoperative position (Figs. 1 and 1A).

While we have shown a preferred embodiment of our invention it is evident that changes and modifications in the construction herein shown and described may be made that would come within the scope thereof and it is not intended, therefore, to limit the invention to the precise details of construction shown.

We claim:

1. In a recording scale, weight value selector means, recording mechanism, recording operating mechanism, means for transmitting the weight value set up by the weight value selector means to the recording mechanism, and a single centrally disposed and rotatable universal control member having an axially offset portion adapted to engage directly and separately the weight value selector means and the recording operating mechanism and thereby effect in one revolution the complete cycle of operation of the recording operating mechanism.

2. In a recording scale, weight value selector means, recording mechanism comprising slidable type plates, means to position the type plates at the printing station and means to align and lock the said type plates at the said printing station, recording operating mechanism, means for transmitting the weight value set up by the weight value selector means to the recording mechanism, and a single rotatable universal control member adapted to directly and separately engage the weight value selecting means and the recording operating mechanism and thereby effect in one revolution the complete cycle of operation of the recording operating mechanism.

3. In a recording scale, weight value selector means, recording mechanism, means for transmitting weight value set up by the weight selector means to the recording mechanism, and a rotatable universal control cam for successively actuating in one revolution the said weight value selecting, weight value transmitting and recording mechanisms, actuating means for rotating the said control cam, and a clutch mechanism adapted to operatively connect and disconnect the said actuating means to the control cam including, a spring actuated pawl carried by the said clutch mechanism, a vertically disposed plunger adapted normally to engage the said pawl and hold it in its inoperative position, and manually controlled means for retracting the said plunger and thereby permitting the pawl to function and connect the actuating means to the cam in effecting its rotation.

4. In a recording scale, a dial having an indicator mounted on a shaft, weight value selector mechanism secured to the said shaft, and means for increasing the capacity of the scale including drop weight mechanism, a segment co-axially mounted with respect to the said indicator shaft, operatively connected to the drop weight mechanism and provided with weight value selector means denoting the weight value of each drop weight.

5. In a recording scale, a dial having an indicator mounted on a shaft, weight value selector mechanism secured to the said shaft, means for increasing the capacity of the scale including drop weight mechanism, a segment co-axially and independently mounted with respect to the said indicator shaft, operatively connected to the drop weight mechanism and provided with weight selector means denoting the weight value of each drop weight, recording mechanism, and means for transmitting the weight values set up by the said segment to the recording mechanism.

6. In a recording scale, weighing mechanism, a revolvable indicator mounted on the outer end of a shaft, and weight value selecting mechanism comprising a series of spaced, notched skeleton weight selector and locating discs, the inner discs being carried by transverse supports attached to the peripheral portions of the outer discs, all the said discs being joined together in an integral weight value selecting assembly unit and mounted on the inner end of the said indicator shaft.

7. In a recording scale, weighing mechanism, a revolvable indicator mounted on the outer end of a shaft, and weight value selecting mechanism comprising a series of notched skeleton weight selector and locating discs joined together by spaced pins and held in spaced relation by spacers, the discs being mounted on a hub which is fixedly mounted on the inner end of the said indicator shaft.

8. In a recording scale, weighing mechanism, a revolvable indicator mounted on the outer end of a shaft, and weight value selecting mechanism comprising a series of spaced, notched skeleton weight selector and locating discs including a unit disc, a tens disc, a hundreds disc, a thousands disc and a locating disc for locating the discs at the proper indicator registration, all being joined together in an integral weight value selecting assembly unit and mounted on the inner end of the said indicator shaft.

9. In a recording scale, weighing mechanism, a revolvable indicator mounted on the outer end of a shaft, and weight value selecting mechanism comprising a series of notched skeleton weight selector and locating discs, the outer discs being provided with spokes attached to a hub which is fixedly mounted on the inner end of the indicator shaft, while the inner discs formed into flat annular rings are mounted on spaced pins carried by the outer discs and provided with spacers between the various discs, whereby all the discs are assembled in an integral weight selector assembly unit.

10. In a recording scale, weighing mechanism a revolvable indicator mounted on the outer end of a shaft, and weight value selecting mechanism comprising a series of spaced, notched skeleton weight selector discs and a notched locating disc adapted to locate or register each of the weight selector discs at the nearest point where the indicator registers the weight of the load, all the said discs being joined together in an integral weight value selecting assembly unit and mounted on the inner end of the said indicator shaft.

11. In a recording scale, weighing mechanism, an indicator shaft operatively connected to the said weighing mechanism, a revolvable indicator mounted on the said shaft, weight value selecting mechanism comprising a hub secured to the said shaft and a series of skeleton weight selector discs and a locating disc, each being provided on its periphery with a series of notches and mounted on the said hub, spaced pins inserted in the peripheral portions of the discs and joining the discs together, and spacers carried by the said pins and adapted to hold the said discs in spaced relation to each other.

12. In a recording scale, weighing mechanism, weight value selector means for setting up the weight value of the load and operatively connected to the weighing mechanism, recording mechanism, a rotatable control cam co-operating therewith, and means for transmitting the weight values set up by the weight selector means to the recording mechanism including weight selector fingers co-operating therewith, pivoted type bar operating levers pivotally connected at their upper ends to the selector fingers and held by coiled springs in engagement with the said control cam.

13. In a recording scale, weighing mechanism, weight selector means for setting up the weight value of the load and operatively connected to the weighing mechanism, weight selector fingers co-operating with the weight selector means, recording mechanism including type bars and type bar operating levers operatively connected to the said selector fingers, a locating disc co-operating with the said weight selector means, a selector finger for the said locating disc, and a pivotally mounted lever, pivotally connected at its upper end to the said locating disc selector finger and carrying a roller on its lower end and adapted to be engaged and actuated by one of the said type bar operating levers in moving the selector finger to and from the selector disc.

14. In a recording scale, weighing mechanism, weight value selector means for setting up the weight value of the load and operatively connected to the weighing mechanism, recording mechanism, a rotatable control cam co-operating therewith, means for transmitting the weight values set up by the weight selector means to the recording mechanism including weight selector fingers co-operating therewith, and adjustable means for connecting the said selector fingers and type bar operating levers comprising a member slidably mounted on the inner end of each weight selector finger and carrying adjustable means engaging upright arms on the said member and a fixed stud on the selector finger and means for securing the said member in its adjusted position.

15. In a recording scale, weighing mechanism, weight value selector means for setting up the weight value of the load and operatively connected to the weighing mechanism, recording mechanism, a rotatable control cam co-operating therewith, means for transmitting the weight values set up by the weight selector means to the recording mechanism including weight selector fingers co-operating therewith, pivoted type bar operating levers pivotally connected at their upper ends to the selector fingers, type bars pivotally connected to the lower end of the said type bar operating levers each one being provided on the lower side with a series of type numerals and on the upper side with a series of transverse notches corresponding in number with the number of type numerals on the respective type bar, an aligning dog slidably mounted above the type bars in a grooved guide block and provided with a relatively long V-shaped lower edge adapted in its operative position to engage the notches in the said type bars and thereby align and hold the type bars in a fixed position, a pivotally mounted operating lever for the said aligning dog pivotally connected thereto, and means co-operating with the said control cam for actuating the operating lever at a predetermined time in the rotation of the control cam to lower and raise the said aligning dog.

16. In a recording scale, weighing mechanism, weight value selector means for setting up the weight value of the load and operatively connected to the weighing mechanism, recording mechanism, type bar operating levers pivotally connected to the weight value selector means, a series of type bars slidably mounted below the recording mechanism and pivotally connected to the lower ends of the said type bar operating levers carrying on the under side a series of type numerals and on the upper side a series of transverse V-shaped notches corresponding in number to the number of numerals on the respective type bar, and means for aligning and locking the set up numerals of the type bars at the printing station including a vertically slidable aligning dog adapted in operation to engage the said notches and to thus align and lock the said numerals in a fixed position.

17. In a recording scale, weighing mechanism, weight selecting mechanism for setting up the weight value of the load and operatively connected to the weighing mechanism, means for transmitting the weight value set up thereby including pivotally mounted type bar operating levers pivotally connected to the said weight value transmitting means and slidably mounted type bars each carrying a series of type numerals and pivotally connected to the said type bar operating levers, a rotatable control cam, and a drag arm inwardly inclined and adapted to be engaged by the inner edge of the said control cam in its initial downward movement, whereby the said type bar operating levers are held in check and are permitted to gradually move forward to locate their type numerals at the printing station.

18. In a recording scale, weighing mechanism, weight selecting mechanism for setting up the weight value of the load and operatively connected to the weighing mechanism, means for transmitting the weight value set up thereby including pivotally mounted type bar operating levers pivotally connected to the said weight value transmitting means and slidably mounted type bars each carrying a series of type numerals and pivotally connected to the said type bar operating levers, a rotatable control cam, and printing mechanism including a printing ribbon mounted on spaced spools adapted to travel transversely of and below the said type numerals at the printing station, and a ratchet wheel for operating the upper ribbon spool, a pivotally mounted ribbon spool actuating bar provided with a beveled lower edge at its free end and a laterally extending operating pin adapted to be engaged by the said control cam in its rotation and thereby push down the actuating bar to engage the said ratchet wheel and thus move the ribbon along after the operation of the printing mechanism.

19. In a recording scale, weighing mechanism, weight selecting mechanism for setting up the weight value of the load and operatively connected to the weighing mechanism, means for transmitting the weight value set up thereby including pivotally mounted type bar operating levers pivotally connected to the said weight value transmitting means and slidably mounted type bars each carrying a series of type numerals and being pivotally connected to the said type bar operating levers, a rotatable control cam and printing mechanism cooperating with the said type numerals including a pivotally mounted printing hammer carrying a platen on its outer end, a printing hammer actuating arm inwardly inclined and leading upwardly from the printing hammer and provided with an actuating coiled spring and having at its free end a roller adapted to be engaged by the said control cam in its rotation in cocking the said printing hammer.

20. In a recording scale, weighing mechanism, weight selecting mechanism for setting up the weight value of the load and operatively connected to the weighing mechanism, means for transmitting the weight value set up thereby including pivotally mounted type bar operating levers pivotally connected to the said weight value transmitting means and slidably mounted type bars each carrying a series of type numerals and pivotally connected to the said type bar operating levers, and printing mechanism including a pivotally mounted printing hammer, and a pivotally mounted cocking and releasing bell crank lever for the said printing hammer disposed above the lower end of the printing hammer having at the end of its lower arm a depending hook normally engaging in its cocked position a laterally extending pin carried by the printing hammer and thus cocking the printing hammer.

21. In a recording scale, weighing mechanism, weight selecting mechanism for setting up the weight value of the load and operatively connected to the weighing mechanism, a rotatable control cam, means for transmitting the weight value set up by the weight value selecting mechanism including pivotally mounted type bar operating levers pivotally connected to the said weight value transmitting means and slidably mounted type bars each carrying a series of type numerals and pivotally connected to the said type bar operating levers, spring actuated printing mechanism including a printing hammer, a pivotally mounted operating lever disposed above the control cam, carrying a roller on the outer end and a depending printing actuating rod on the inner end, and a pivotally mounted cocking and releasing lever for the said printing hammer disposed above the lower end of the printing hammer having at the end of its upper arm a laterally extending pin adapted to be engaged by the said actuating rod, when the operating lever roller is engaged by the control cam in its rotation, thereby rocking the cocking lever and releasing the cocking lever from the co-operating printing hammer, thus freeing and firing the printing hammer through the action of the spring connected to the hammer, which causes the platen to strike and print the weight value registered by the type numerals on a ticket inserted between the platen and the ribbon.

22. In a recording scale, weighing mechanism, a dial and indicator co-operating with the weighing mechanism, weight selector discs for setting up the weight value of the load including a full capacity dial disc denoting a weight value of a plurality of units and operatively connected to the weighing mechanism, weight selector fingers co-operating with the weight selector discs, recording mechanism including type bars and type bar operating levers operatively connected to the said selector fingers, increased capacity mechanism co-operating with the said weight selector discs including a segment, and differential means for combining the weight value set up by the said dial capacity disc with the weight value set up by the segment comprising opposed rack bars operatively connected to the dial capacity disc and the segment, slidably mounted in guide blocks and having their teeth facing inwardly, a plate slidably mounted below the said rack bars and having a centrally mounted rotatable gear wheel with its teeth meshing with the teeth of the said rack bars, and an arm extending from the said plate and pivotally connected to its co-operating type bar operating lever.

23. In a recording scale, weighing mechanism, weight selecting means for setting up the weight value of the load and operatively connected to the weighing mechanism, a rotatable control cam, means for transmitting the weight value set up by the said weight selecting means including pivotally mounted type bar operating levers operatively connected to the weight value transmitting means and slidably mounted type bars each carrying a series of numerals and operatively connected to the said type bar operating levers, printing mechanism including a pivoted printing hammer, an actuating coiled spring for the said hammer, a cocking and releasing lever for the said hammer and carrying at the end of its upper arm a laterally extending actuating pin, an aligning dog for aligning the type numerals, and means for operating the aligning dog and the cocking lever including a pivotally mounted operating control lever, a roller carried on the outer end of the operating control lever adapted to be engaged by the control cap in its relation and thereby cause the said operating control lever to swing to its horizontal operative position, a depending resiliently mounted rod adjacent to the cu'er end of the said lever operating control and adapted in operation to actuate the said aligning dog, and a depending printing actuating rod attached to the inner end of the said operating control lever and adapted to actuate the said cocking lever and thereby to fire the printing hammer.

24. In a recording scale, weighing mechanism, weight selecting means for setting up the weight value of the load and operatively connected to the weighing mechanism a rotatable control cam, means for transmitting the weight value set up by the said weight selecting means including pivotally mounted type bar operating levers operatively connected to the weight value transmitting means and slidably mounted type bars each carrying a series of numerals and operatively connected to the said type bar operating levers, printing mechanism including a pivoted printing hammer, an actuating coiled spring for the said hammer, a cocking and releasing lever for the said hammer and carrying at the end of its upper arm a laterally extending actuating pin, an aligning dog mounted on a pivoted lever adapted to align the said type numerals at the printing station, a pivotally mounted operating control lever disposed above the rotatable control cam provided with a downwardly inclined outer end carrying a roller, a depending aligning dog actuating rod resiliently mounted on the said operating control lever at its outer end operatively connected to the said aligning dog lever, and a depending printing actuating rod mounted on the inner end of the said lever and operatively connected to the aligning dog, the roller of the said operating control lever being engaged by the control cam in its rotation, thereby swinging its inclined outer end outwardly and raising its depending aligning dog rod so as to actuate the aligning dog, while the inner end of the operating control lever is swung to a horizontal position thereby carrying its depending printing actuating rod into engagement with the said actuating pin of the cocking and releasing lever, thereby releasing it from its cocked position and firing the printing hammer.

25. In a recording scale, weighting mechanism, weight value selector means for setting up the weight value of the load and operatively connected to the weighing mechanism, recording mechanism, type bar operating levers pivotally connected to the weight value selector means, a series of type bars slidably mounted below the recording mechanism and pivotally connected to the lower ends of the said type bar operating levers carrying on the under side a series of type numerals and on the upper side a series of transverse V-shaped notches corresponding in number to the number of numerals on the respective type bar, and means for aligning and locking the set up numerals of the type bars at the printing station including an aligning dog slidably mounted in a groove in a vertically disposed guide block and held therein by a retaining plate attached to the guide block, and operatively connected to the recording mechanism, being adapted in operation to engage the said notches set up by the said type bar levers and thus align the type bars and set up the numerals registering the weight value of the load established by the weighing mechanism.

26. In a recording scale, weighing mechanism, weight value selector means for setting up the weight value of the load and operatively connected to the weighing mechanism, recording mechanism, type bar operating levers pivotally connected to the weight value selector means, a series of type bars slidably mounted below the recording mechanism and pivotally connected to the lower ends of the said type bar operating levers carrying on the under side a series of type numerals and on the upper side a series of transverse V-shaped notches corresponding in number to the number of numerals on the respective type bar, and means for aligning and locking the set up numerals of the type bars at the printing station including a pivotally mounted operating lever under control of the recording mechanism, an actuating lever pivotally mounted in a bracket and having a longitudinal slot in its inner end, an aligning dog slidably mounted in a grooved guide block spaced from the said bracket and carrying in its slotted upper end a fixed pin inserted and pivoting in the said slot in the lever end, and a resiliently mounted rod depending from the outer end of the said operating lever pivotally connected to the actuating lever and adapted in operation to rock the actuating lever and cause the aligning dog to slide downwardly and engage the said set up notches of the type bars.

27. In a recording scale, weight value selector means, recording mechanism, means for transmitting the weight value set up by the weight selector means to the recording mechanism, printing mechanism, a printing ribbon co-operating with the printing mechanism, means for feeding the said ribbon to the printing mechanism, means for actuating the said ribbon feeding mechanism, operating means for each of the said mechanisms, and a rotatable universal control cam adapted in one revolution to engage directly and separately each of the said operating means and thereby effect successively the operation of the said mechanisms.

HARLAN A. HADLEY.
GULDBRAND GULDBRANDSEN.